US 6,554,657 B2

(12) United States Patent
Krause et al.

(10) Patent No.: US 6,554,657 B2
(45) Date of Patent: Apr. 29, 2003

(54) BATTERY CLAMP

(75) Inventors: Jens Krause, Rahden (DE); Roland Konersmann, Georgsmarienhütte (DE); Ludger Leve, Rahden (DE)

(73) Assignee: Harting Automotive GmbH & Co. KG (DE)

(*) Notice: Subject to any disclaimer, the term of this patent is extended or adjusted under 35 U.S.C. 154(b) by 0 days.

(21) Appl. No.: 09/923,566

(22) Filed: Aug. 7, 2001

(65) Prior Publication Data

US 2002/0022410 A1 Feb. 21, 2002

(30) Foreign Application Priority Data

Aug. 8, 2000 (DE) ............................ 10038650

(51) Int. Cl.⁷ ................................ H01R 4/50
(52) U.S. Cl. ...................... 439/773; 439/754; 439/763; 439/757
(58) Field of Search ................. 439/761–762, 439/773, 757–759, 756, 754, 763

(56) References Cited

U.S. PATENT DOCUMENTS

| 1,596,891 A | | 8/1926 | Rensch | |
|---|---|---|---|---|
| 2,769,964 A | * | 1/1952 | Lartz | 439/757 |
| 3,116,100 A | * | 7/1962 | Hunter | 439/757 |
| 5,454,741 A | | 10/1995 | Okada | 439/762 |
| 5,498,178 A | | 3/1996 | Tabata | 439/762 |
| 5,616,055 A | | 4/1997 | Heeren | 439/761 |
| 5,752,861 A | * | 5/1998 | Cherry et al. | 439/783 |

FOREIGN PATENT DOCUMENTS

| CA | 0458151 | * | 7/1949 | 439/761 |
|---|---|---|---|---|
| CA | 0605717 | * | 9/1960 | 439/773 |
| DE | 1 250 519 B | | 3/1965 | |
| DE | 36 43 087 A1 | | 12/1986 | |
| DE | 94 05 680 U1 | | 4/1994 | |
| DE | 44 26 591 A1 | | 7/1994 | |
| WO | WO 98/27620 | | 6/1998 | |

* cited by examiner

Primary Examiner—Tho D. Ta
Assistant Examiner—Larisa Z. Tsukerman
(74) Attorney, Agent, or Firm—Hayes Soloway P.C.

(57) ABSTRACT

A battery clamp for being connected to a battery contact comprises a connecting lug, a contact ring which is provided with a slot so as to form two opposite clamping ends, and a spring which engages the clamping ends of the contact ring. The battery clamp further comprises a blocking wedge which can be shifted between a contact position in which it releases the clamping ends such that the spring can pull the clamping ends together, a mounting position in which it keeps the clamping ends of the contact ring to be spread apart such that the battery clamp can be placed on the battery contact, and a pull-off position in which it spreads the clamping ends of the contact ring to a larger degree than in the mounting position such that the battery clamp can be pulled off from the battery contact.

19 Claims, 8 Drawing Sheets

BATTERY CLAMP

TECHNICAL FIELD

The invention relates to a battery clamp with which a usually conical battery contact consisting of lead can be contacted.

BACKGROUND OF THE INVENTION

The problem occurring when such a battery contact is contacted consists in observing a defined contact force as precisely as possible for the reliable contacting. In case the contact forces are too small, only insufficient metallic contact results between the battery contact and the battery clamp. However, if the contact forces are excessively great, this will lead to a deformation and the flowing of the battery contact material.

The most common battery clamp consists of a contact clip which is placed onto the battery contact and is then pulled together by means of a screw. The drawback of this kind of battery clamp is that the actually applied contact force can be controlled only insufficiently. On the one hand, there is the danger that by tightening the screw with a wrench a much greater tightening torque and thus a much greater contact force is applied than actually required. On the other hand there is the danger that if the battery clamp is used for an already deformed battery contact the contact clip will be pulled to block by the screw so that a high tightening moment for the screw is obtained, which, however, does not correspond with the actually obtained smaller contact force.

The prior art also discloses various battery clamps which use spring elements which are to ensure a constant contact force. However, these battery clamps have a comparatively complex design.

BRIEF SUMMARY OF THE INVENTION

The object of the invention consists in providing a battery clamp which can be produced simply and in cost-effective manner and is simultaneously fail-safe in handling, i.e. can be mounted both manually and in automated fashion with a high degree of reliability without incorrect mounting occurring, and which can be detached again with low effort.

This object is achieved in a battery clamp comprising a connecting lug, a contact ring which is provided with a slot so as to form two opposite clamping ends, and a spring which engages the clamping ends of the contact ring. The battery clamp further comprises a blocking wedge which can be shifted between a contact position in which it releases the clamping ends such that the spring can pull the clamping ends together, a mounting position in which it keeps the clamping ends of the contact ring to be spread apart such that the battery clamp can be placed on the battery contact, and a pull-off position in which it spreads the clamping ends of the contact ring to a larger degree than in the mounting position such that the battery clamp can be pulled off from the battery contact. Thus, three defined states of the battery clamp are possible. In the mounting position the battery clamp can be slipped freely on the conical battery contact until the contact ring abuts in planar fashion against the battery contact. In the contact position the contact ring is resiliently pulled together around the battery contact. The contact force applied in this case is determined by the spring design and in this connection remains constant even over a prolonged period of time because of the resilient bias applied by the spring. In the pull-off position the contact ring is spread to a larger degree as is the case on mounting. This ensures that the battery clamp can easily be pulled off, despite a possible settling phenomenon in the mounted state and despite a possible prestress which is applied on the contact ring during mounting.

According to a preferred embodiment of the invention, each clamping end is provided with a bent-off lug which comprises a first slope each and the blocking wedge is arranged between the lugs of the clamping ends. With this design, a translatory motion of the blocking wedge, which can be achieved simply, suffices to spread the contact ring from the contact position into the mounting position.

According to the preferred embodiment of the invention each lug is provided with an arresting edge. The blocking wedge can support on this arresting edge if it is in its mounting position in which the clamping ends of the contact ring are held in a spread condition. In this way, a comparatively great actuation force is required to move the blocking wedge beyond the arresting edge to reach the clamping position; this ensures that unintended transfer of the battery clamp from the mounting position to the contact position is prevented. The great actuation force to be applied also results in an advantageous kind of battery clamp mounting. If the arresting edge is designed to be sharp-edged, as is preferred, the blocking wedge cannot be moved beyond the arresting edge by a mere force of pressure. This will only be possible if the clamping ends were slightly spread beforehand. This can be achieved by forcing the battery clamp, being in the mounting position, onto the conical battery contact. The contact ring is spread slightly by the conical battery contact not until the battery clamp is forced onto the battery contact by the application of a defined force, so that planar contact results. Then, the spreading wedge can slip over the arresting edge and release the clamping ends of the contact ring, so that the spring can pull the clamping ends together. The final contact force is thus determined exclusively by the spring design, however the preceding forcing of the battery clamp onto the battery contact ensuring that planar contact occurs between the battery contact and the contact ring. This results in a high mounting reliability, since the transfer of the blocking wedge from its mounting position to its contact position will not be possible until it is signaled by the corresponding spreading of the contact ring that a defined previous contact force was built up between the contact ring and the battery contact. This previous contact force ensures a reliable fit of the battery clamp, since the regions of a point contact of the battery contact are eliminated by the flowing of the material already when forcing on the battery clamp.

According to a preferred embodiment of the invention it is provided for that each lug is additionally provided with a second slope which, as seen from the first slope, lies behind the arresting edge, the minimal distance between the two opposite second slopes being smaller than the distance between the two opposite arresting edges. With this design, the pull-off position can easily be brought about in that the blocking wedge is pulled from the contact position beyond the arresting edge as far as into the region of the second slope. As the two second slopes lie closer to each other than do the two arresting edges, it is ensured that the contact ring is spread in the pull-off position to a larger degree than during mounting; during mounting the contact ring is spread just so much that the blocking wedge can slip through the two arresting edges.

According to the preferred embodiment of the invention it is provided for that the blocking wedge is connected with a shiftily mounted covering cap. The covering cap serves both as a protection for the battery clamp and a mounting aid. The covering cap offers a suitable pressure surface area in order to apply the required putting-on force by hand. The force of pressure exerted on the covering cap simultaneously serves for transferring the blocking wedge from the mounting position to the contact position. Since the putting-on of the battery clamp and the subsequent locking by transferring the blocking wedge from the mounting position to the contact position is effected in a single direction, mounting can be automated easily. Manual mounting does not cause any problems either, since it only consists of forcing the battery clamp onto the battery contact. In both cases, the jolting overcoming of the arresting edge by the blocking wedge represents a well noticeable indication of the fact that the mounting has been concluded successfully in both automated and manual mounting.

According to the preferred embodiment, the contact ring is provided with at least one recess, and a key lug is provided on the covering cap. The key lug can rest against an edge of the recess and prevents a movement of the blocking wedge into the contact position if there is not arranged a battery contact in the interior of the contact ring. In this way, it is ensured that the blocking wedge cannot unintentionally reach the contact position, e.g. during transport, which would mean that the subsequent mounting of the battery clamp is not possible.

The key lug preferably extends along the direction of movement of the blocking wedge, and is provided with two sloped surfaces which cooperate with a slope on the edge of the recess. This alignment of the key lug results in a high load carrying ability when there is a pressure exerted on the covering cap, and the slope surfaces are arranged such that the holding force of the key lug in the recess is increased with such pressure.

According to an alternative embodiment the key lugs may also be arranged perpendicularly to the direction of movement of the blocking wedge, i.e. horizontally on the covering cap. This offers advantages with regard to the elasticity and the required and allowable spring excursion.

It is preferred that a lever is supported on the covering cap, which rests against the contact ring and by means of which the blocking wedge can be brought from the contact position via the mounting position into the pull-off position. The lever, when suitably supported, must only be lifted upwards and away from the battery contact, whereby both the transfer of the contact ring from the contact position to the pull-off position and the lifting of the battery clamp from the battery contact is obtained by means of a motion in a single direction. As an alternative to the lever it is also possible to use an eccentric which can spread the lugs of the contact ring by a rotary motion and release them again.

Preferably, the lever is provided with a first support surface which can rest against the contact ring, and with a second support surface which, as seen from the axis of rotation of the lever, lies outside the first support surface, a contact area being formed between the first and second support surfaces. The contact area can get into contact with a suitable contact step on the contact ring and reliably prevents that the lever is "overstretched", i.e. is pivoted exceedingly far.

Preferably, the spring is provided with a holding lug and the blocking wedge is provided with a holding projection which is able to get into contact with the holding lug and limits the shift length of the blocking wedge. The holding projection is here preferably designed such that it snaps into place behind the holding lug during mounting the covering cap to the contact ring, by this lug being bent elastically outwards.

According to a preferred embodiment of the invention the inner side of the contact ring is provided with a knurling. This ensures a reliable fit of the contact ring on the conical battery contact so that the contact ring cannot "float away" upwardly. As an alternative, grooves may further be provided which run along the longitudinal direction of the battery contact and provide sufficient mechanical friction between the battery contact and the contact ring.

Advantageous embodiments of the invention will be apparent from the subclaims.

BRIEF DESCRIPTION OF THE DRAWINGS

FIG. 3 shows the contact ring with the connecting lug of FIG. 2, a spring being placed on;

DETAILED DESCRIPTION OF THE PREFERRED EMBODIMENT

Figure 6:
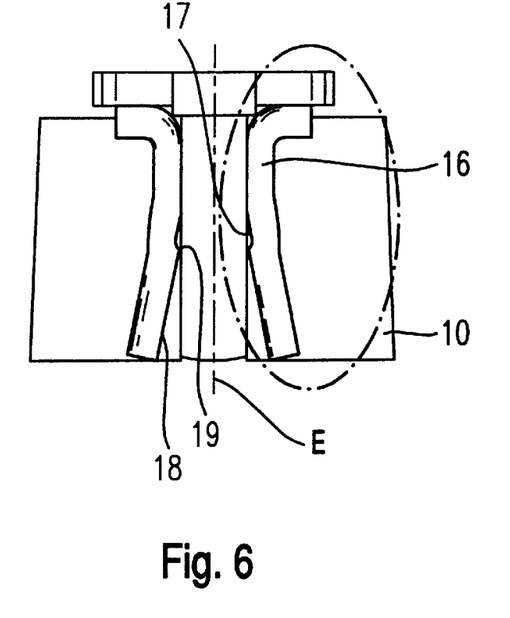
FIG. 6 shows the contact ring of the battery clamp of FIG. 1 in a front view.
Figure 7:
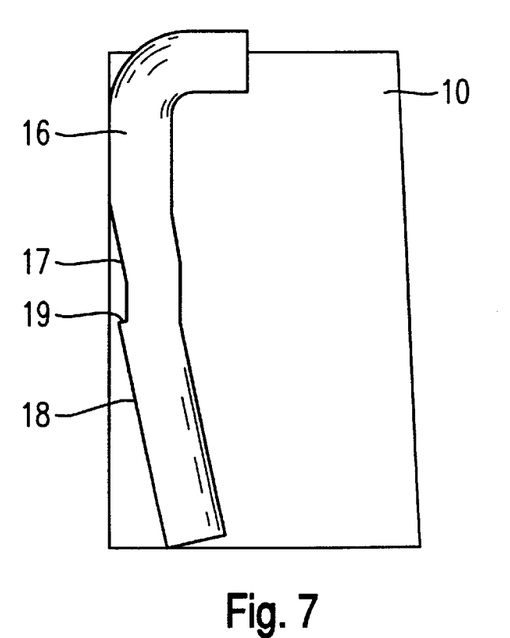
FIG. 7 shows the detail VII of FIG. 6 in an enlarged view.

The battery clamp has a contact ring 10 as a central component, which is provided with a connecting lug 12. The connecting lug serves for contacting any conductor which is to be connected to a battery contact. The contact ring 10 is designed with a slot to form two opposite clamping ends 14 each provided with a lug 16. Each lug 16 is provided with a first slope 18, an arresting edge 19 as well as a second slope 17 (see in detail FIGS. 6 and 7). The arresting edge is arranged between the first and second slopes and protrudes by about 0.3 to 0.5 mm with respect to the run-out region of the second slope 17. The second slope is designed such that it has a minimum distance from a center plane E of the contact ring (cf. FIG. 6), namely at the upper end with respect to the Figures, which is smaller than the distance of the arresting edge from this plane. The function of this configuration will be explained later.

The component consisting of the contact ring 10 with the lugs 16 and the connecting lug 12 is a one-piece bent sheet metal part having a wall thickness of about 1.5 to 1.8 mm. Here, the contact ring 10 is bent so as to adapt it to the conical shape of the battery contact to be connected.

Figure 3:
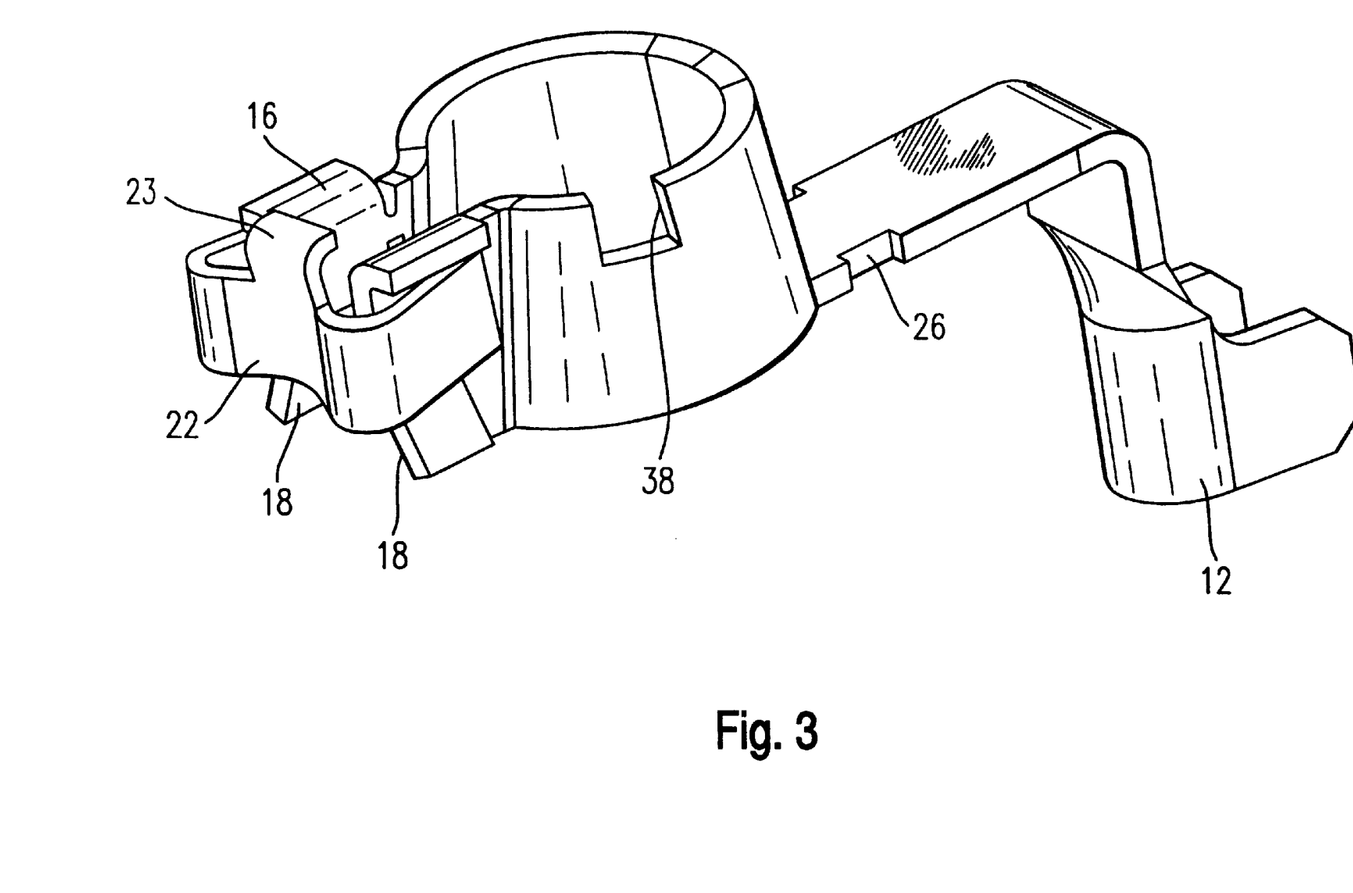

A spring 22 (see FIG. 3) engages the lugs 16 of the contact ring 10, which spring tries to press the lugs 16 together. In order to prevent the spring 22 from slipping off, it is provided with two projections which engage recesses 20 formed on the lugs 16. The spring is further provided with a holding lug 23, the function of which will be explained later.

The contact ring 10 is provided with two opposite recesses 38, of which for the sake of better clarity only one is shown in the Figures. Starting from the edge of the contact ring which is the upper edge when regarding the Figures, the recesses extend downwards, i.e. starting from that side at which the upper side of the battery contact to be contacted will be disposed later on. The lower edge of the recesses is provided with an inner slope 40 and an outer slope 42 (see FIG. 11).

The battery clamp is provided with a covering cap 24 (see in particular FIG. 1) which covers the contact ring 10 and is pivotally supported on notches 26 of the connecting lug 12. The covering cap 24 is provided with a blocking wedge 28 which is integrally formed on the covering cap 24 by a material ridge 30 and is positioned between the two lugs 16 of the contact ring 10. A holding projection 44 is provided on the material ridge 30, which projection can cooperate with the holding lug 23 on the spring 22.

Two key lugs 46 are elastically arranged on the covering cap, which extend starting from a lower edge of the covering cap (see FIG. 11) upwards to the lid part of the covering cap, and their free ends are each provided with a key protrusion 48 which projects through the recess 38 into the interior of the contact ring. On the side facing its inner slope 40 and outer slope 42, the key protrusion 48 has a first slope surface 50 and a second slope surface 52, respectively.

A two-armed lever 32 is supported on the covering cap 24 by means of bearing pins 34. One arm forms a handle portion 54 which overlies the contact ring, and the other arm comprises a support surface 56 which is supported by abutment surfaces 36 formed on the lugs 16. The lever 32 is forked in this region, so that the material ridge 30 can extend between the two ends which are supported by the supporting surfaces 36.

Figure 1:
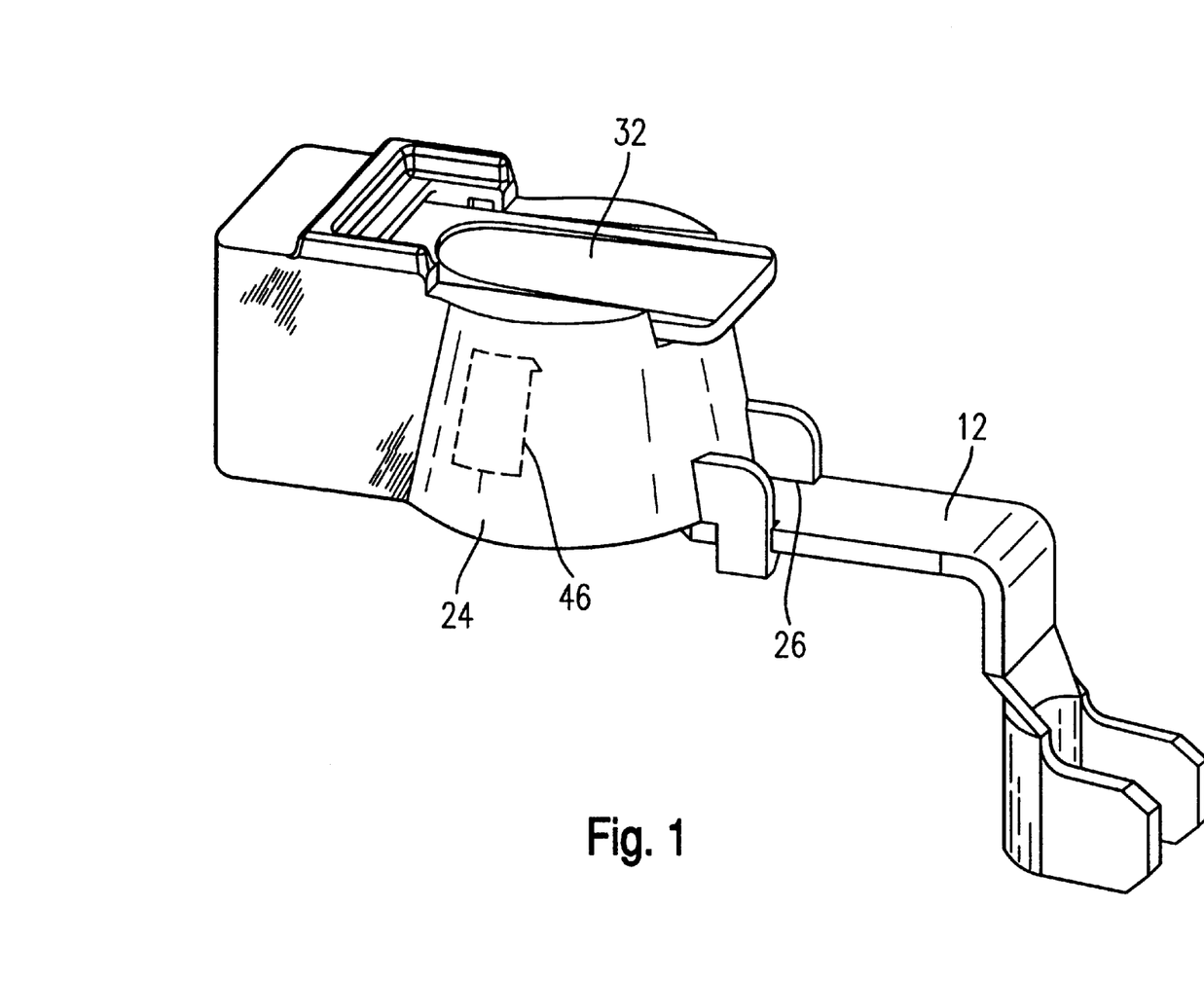
FIG. 1 shows a battery clamp according to a preferred embodiment in a perspective view.
Figure 2:
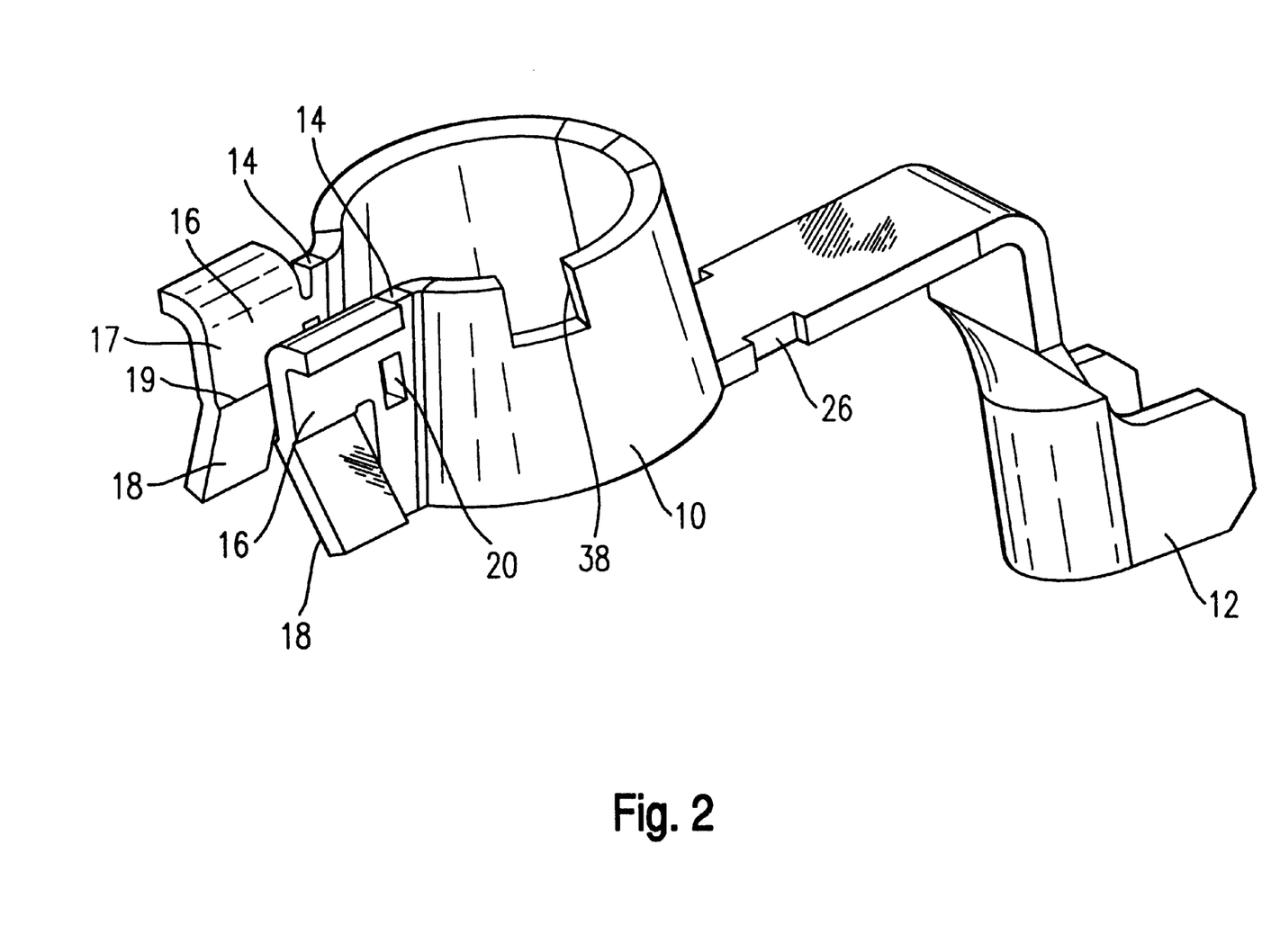
FIG. 2 shows the contact ring with the connecting lug, which is used in the battery clamp of FIG. 1, in a perspective, schematic view.
Figure 4:
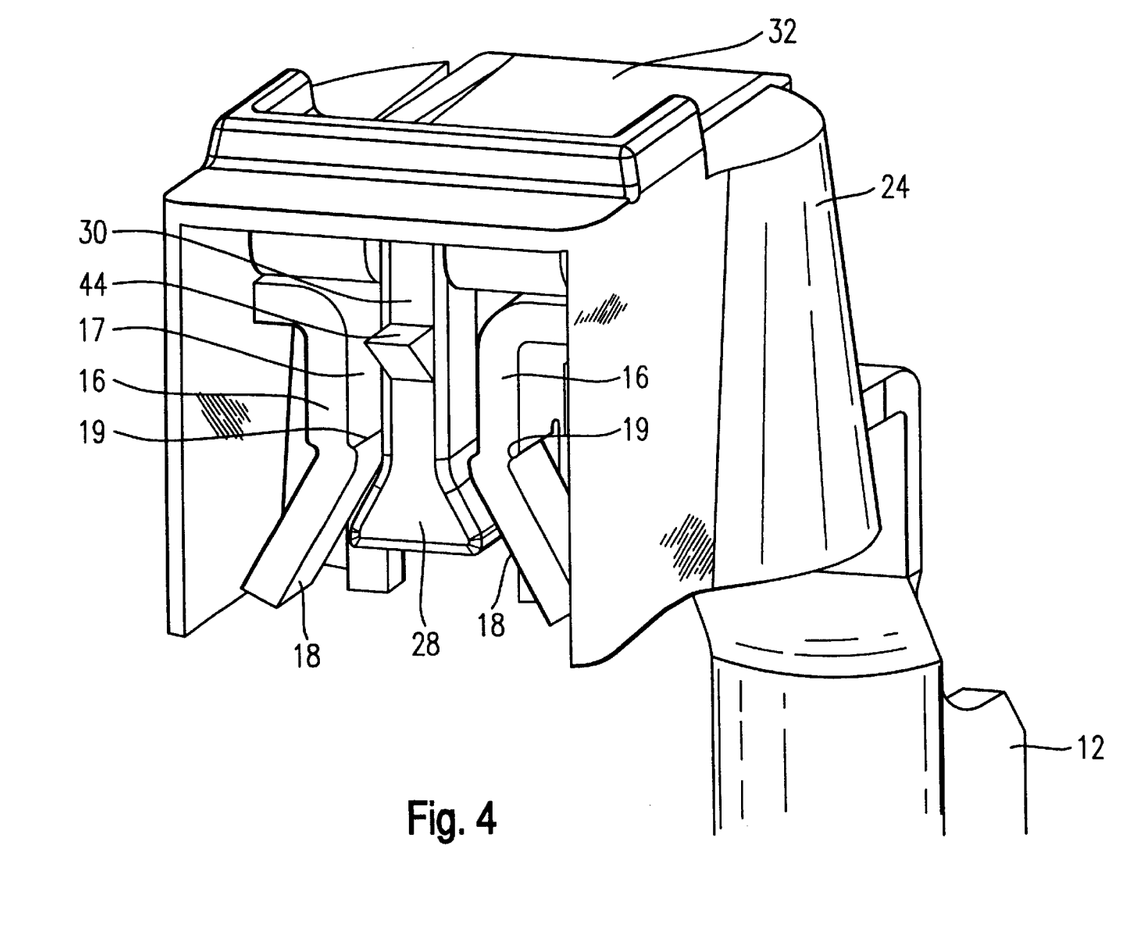
FIG. 4 shows a detail of the battery clamp of FIG. 1 in a perspective, schematic view.
Figure 5:
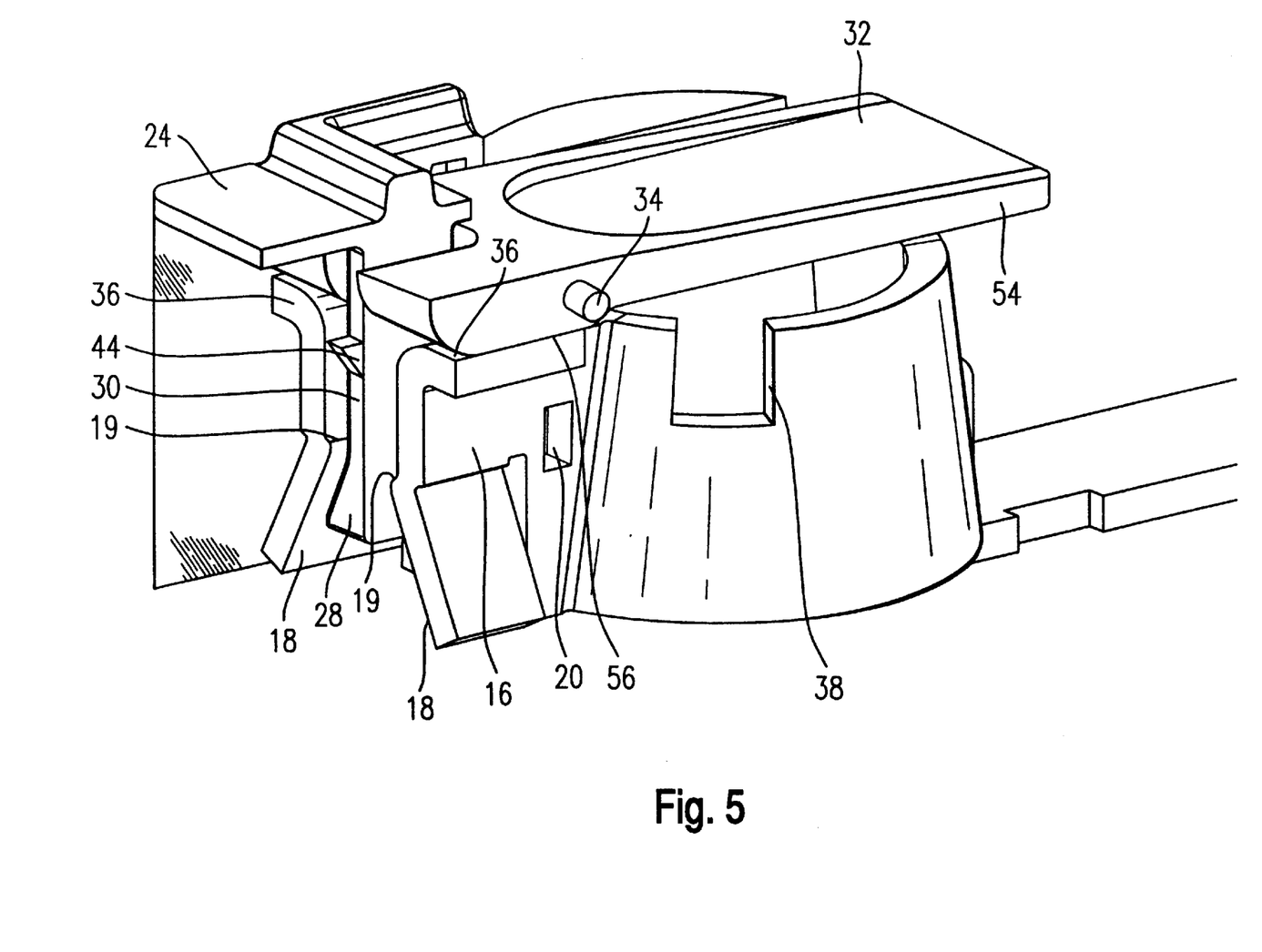
FIG. 5 shows another detail of the battery clamp of FIG. 1 in a perspective, schematic and partially cut view.

The blocking wedge 28 together with the covering cap 24 can be shifted between a contact position which is shown in the FIGS. 1, 4 and 5, as well as a mounting position and a pull-off position which both are not shown in the Figures. In the contact position, the blocking wedge is disposed in an area between the two slopes 18, in which it does not touch them. Thus, the two lugs 16 can be pulled together by the spring 22. In the mounting position, the blocking wedge 28 is disposed between the two lugs 16 above of the two slopes 18, it abutting against the arresting edge 19 which prevents that it reaches the contact position unintentionally. In the pull-off position, the blocking wedge is disposed between the two second slopes 17, so that the two lugs are spread to a larger degree than in the mounting position.

The battery clamp according to the invention is placed on a battery contact in the following way. When delivered, the battery clamp is in its mounting position in which the blocking wedge 28 spreads the two lugs 16, whereby the contact ring 19 is spread as well. In this state, the key lugs prevent that the blocking wedge can be transferred into the contact position, when the battery clamp is not placed on a battery contact. For transferring the blocking wedge into the contact position, the covering cap to which the blocking wedge is fixed would have to be shifted relative to the contact ring, namely in a downward direction with respect to the Figures. This is not possible as long as the key lugs are in the position shown in FIG. 11, because they each rest against the inner slope 40 of the edge of the recess 38 by the second slope surface 52. If in this position a pressure is exerted on the covering cap, the force by which the key lug is pulled towards the interior of the contact ring will be increased due to the alignment of the inner slope 40 and the second slope surface 52; hence, there is generated a self-locking effect.

Figure 11:
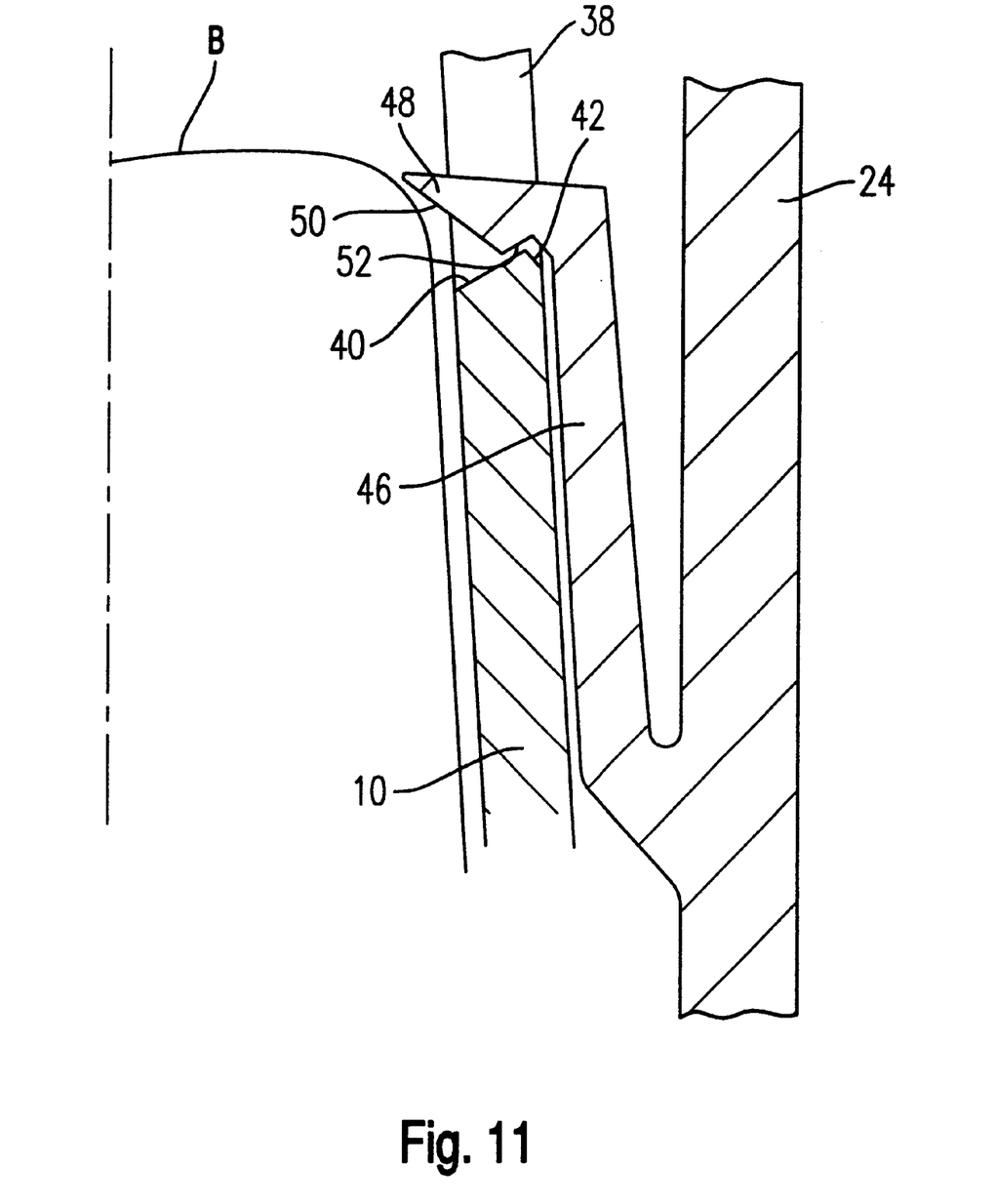
FIG. 11 shows in a sectional, enlarged view a key lug which is used in the battery clamp of FIG. 1.

Only when the battery clamp is slipped on a battery contact (indicated in FIG. 11) so far that the upper end of the battery contact lies against the key lug 48 and urges the latter in an outward direction, i.e. the battery contact is slightly further pushed into the contact ring as is shown in FIG. 11, then the key lug is urged outwards, with in the second slope surface 52 slipping over the edge between the inner slope 40 and the outer slope 42. If this dead center has been overcome, the alignment of the first slope surface 50 and the outer slope 42 will lead to an outwardly directed biasing of the key lug 48, i.e. a shifting of the covering cap relative to the contact ring is no longer prevented. Since the recess 38 lies very far to the rear, as seen in the place-on direction of the battery clamp, the covering cap will be released not until the contact ring is almost completely slipped on the battery contact.

If this is the case, then it is possible to cause a shifting of the covering cap relative to the contact ring by a force of pressure exerted on the covering cap. The force exerted on the covering cap 24 is transmitted to the contact ring 10 via the notches 26, on the one hand, and via the material ridge 30 and the blocking wedge 28 abutting against the arresting edges 19, on the other. Because of the conical design of the battery contact and the contact ring abutting against it, the exerted force of pressure is converted into a spreading force acting on the contact ring 10 when the contact ring is slipped on the battery contact to a corresponding extent. This spreading force slightly widens the contact ring and enables that the blocking wedge 28 slips over the arresting edge 19 under the influence of the still exerted force of pressure when the lugs 16 are moving apart. The covering cap 24 is then further moved onto the contact ring 10, the blocking wedge 28 being transferred into its contact position in which it no longer engages the lugs 16 and the slopes 18. Then, the lugs 16 are pressed together by the spring 22, so that the contact ring is pulled together and a uniform contact force results.

The covering cap is released by lifting the lever 32 at its handle portion 54. This causes the covering cap to be lifted off the contact ring 10 via the bearing pins 34, whereby the blocking wedge 28 is pulled through between the two slopes 18 and beyond the arresting edge 19. By further lifting the lever 32 the blocking wedge reaches the region between the two second slopes 17, so that the contact ring 10 is spread to a larger degree than in the mounting position. In this pull-off position, the battery clamp can be removed from the battery contact without large effort by pulling the lever 32. The two slopes 17 are preferably designed such that the pull-off position is not stable and the blocking wedge will slip back into the mounting position, so that the battery clamp is prepared for being again mounted on a battery contact.

The holding projection 44 is arranged on the center web of the covering cap such that it cooperates in the pull-off position of the blocking wedge with the holding lug 23 on the spring in such a manner that the covering cap can not be forced off the contact ring exceedingly far beyond the pull-off position.

A special advantage of the battery clamp according to the invention consists in carrying out the mounting and dismounting in only one moving direction. For the purpose of mounting only a force of pressure has to be exerted on the covering cap 24 of the battery clamp. This force of pressure initially ensures that the contact ring is firmly forced onto the battery contact to be contacted. Here, a planar contact already results between the battery contact and the contact ring. Transfer of the battery clamp from the mounting position to the contact position will only be possible if the contact force obtained here exceeds a defined value which can be adjusted by the height of the arresting edges 19. Having released the blocking wedge 28, this is performed by the same force of pressure which now moves the blocking wedge into a region in which the wedge no longer engages the lugs and the slopes. This mounting method also brings about a high degree of fail-safe handling. The slipping of the blocking wedge 28 over the arresting edges 19 can be detected reliably in the case of both manual and automated mounting and supplies an indication of the fact that the battery clamp is reliably locked on the battery contact.

The battery clamp is also dismounted along a single actuation direction. Only a pulling force must be exerted on the lever 32 in a direction leading away from the battery contact. This pulling force initially transfers the battery clamp from the contact position via the mounting position to the pull-off position and then pulls the battery clamp off the battery contact.

Figure 8:
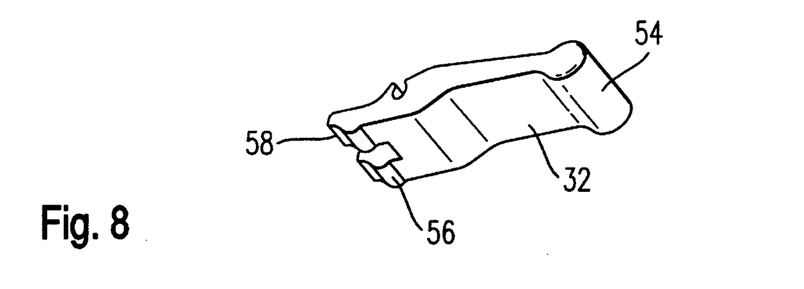
FIG. 8 shows a variant of a lever for the battery clamp in a perspective view.
Figure 9:
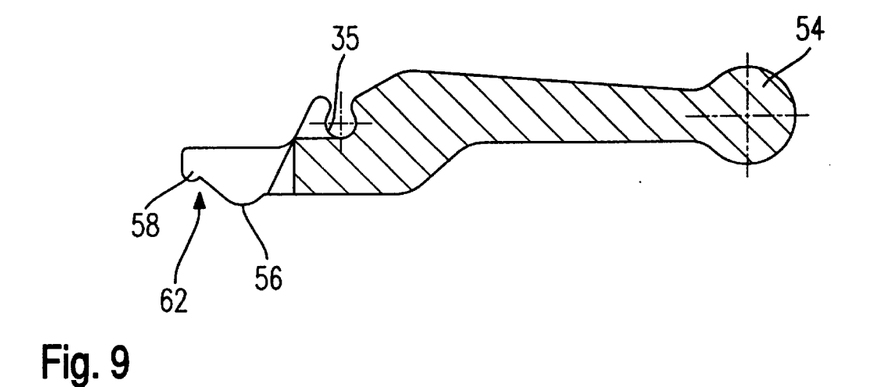
FIG. 9 shows the lever of FIG. 8 in a partially cut view.
Figure 10:
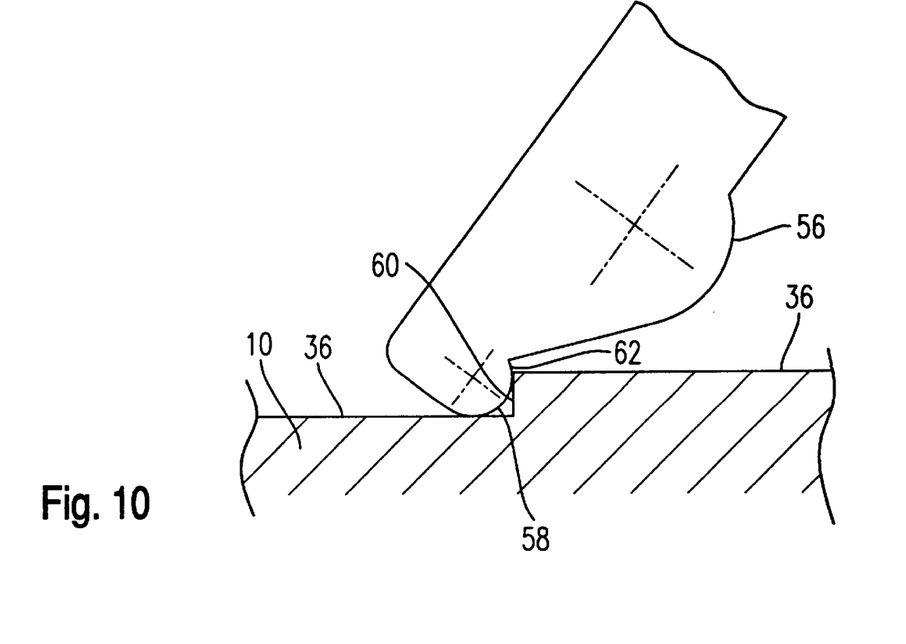
FIG. 10 shows in a broken, enlarged view the front section of the lever of FIG. 8 in cooperation with the contact ring of the battery clamp.

In FIGS. 8 to 10 there is shown a variant of the lever 32, by which the covering cap 24 can be forced off the contact ring, to bring the blocking wedge from the contact position into the pull-off position. Instead of the bearing pins 34, the lever has a bearing groove 35 by means of which the lever snaps into place in an associated bearing edge on the covering cap to be supported there.

At its front end, which lies opposite the handle portion 54, the lever 32 is provided with a first support surface 56 and a second support surface 58 which both are provided for the purpose to rest against the contact ring 10. Both support surfaces are provided with a curved contour, so that they move on rolling contact on the abutment surface 36 of the contact ring when the lever is lifted. The second support surface 58 is set back with respect to the first support surface 56 in relation to a plane which runs through the center of the handle portion 54 and the bearing groove 35. In other words, If the lever is lifted starting from its horizontal position, initially the first support surface will bear against the abutment surface 36 of the contact ring 10, so that the covering cap is forced off the contact ring. As of a predetermined pivot angle of the lever there will occur the transition from the first to the second support surface; the first support surface is lifted off the contact ring. This makes it possible to freely move the first support surface beyond a contact step 60, which is formed on the abutment surface 36 of the contact ring 10 (see FIG. 10). It is at this contact step that a contact area 62 makes contact, this area being formed between the first and the second support surfaces 56, 58. By the contact area resting against the contact step 60, the condition of the lever 32 being exceedingly pivoted into a position which corresponds to the pull-off position of the blocking wedge is reliably prevented.

What is claimed is:

1. A battery clamp connection to a battery contact, said battery clamp comprising:
    a connecting lug;
    a contact ring provided with a slot so as to form two opposite clamping ends;
    a spring for engaging said clamping ends of said contact ring; and
    a blocking wedge, which can be shifted between a contact position in which it releases said clamping ends such that said spring can pull said clamping ends together,
    wherein the clamp may be mounted by spreading the clamping ends of said contact ring such that said battery clamp can be placed on said battery contact,
    wherein the clamp may be removed by spreading the clamping ends of said contact ring further apart than in said mounting position such that said battery clamp can be pulled off from said battery contact,
    wherein each clamping end is provided with a bent-off lug which comprises a first slope,
    wherein said blocking wedge is arranged between said lugs of said clamping ends,
    wherein each lug is provided with an arresting edge, and
    wherein each lug is additionally provided with a second slope which, as seen from said first slope, lies behind said arresting edge, a minimal distance between said two opposite second slopes being smaller than a distance between said two opposite arresting edges.

2. The battery clamp according to claim 1, wherein said blocking wedge is connected with a shiftily mounted covering cap.

3. The battery clamp according to claim 2, wherein a lever is supported on said covering cap, said lever resting against said contact ring and by means of which said blocking wedge can be brought from said contact position via said mounting position into said pull-off position.

4. The battery clamp according to claim 3, wherein said lever is provided with a first support surface which can rest against said contact ring, and with a second support surface which, as seen from an axis of rotation of said lever, lies outside said first support surface, a contact area being formed between said first and second support surfaces.

5. The battery clamp according to claim 4, wherein said contact ring is provided with at least one recess and wherein a key lug is provided on said covering cap, said key lug being adapted to rest against an edge of said recess and preventing a movement of said blocking wedge into said contact position if there is not arranged a battery contact in an interior of said contact ring.

6. The battery clamp according to claim 5, wherein said key lug extends along a direction of movement of said blocking wedge and is provided with two slope surfaces which cooperate with a slope on said edge of said recess.

7. The battery clamp according to claim 1, wherein said spring is provided with a holding lug and wherein said blocking wedge is provided with a holding projection which is able to come into contact with said holding lug and limits a shift length of said blocking wedge.

8. The battery clamp according to claim 1, wherein an inner side of said contact ring is provided with a knurling.

9. The battery clamp according to claim 1, wherein said inner side of said contact ring is provided with grooves which run along a longitudinal direction of said battery contact onto which said battery clamp can be placed.

10. A battery clamp connection to a battery contact, said battery clamp comprising:
    a connecting lug;
    a contact ring provided with a slot so as to form two opposite clamping ends;
    a spring for engaging said clamping ends of said contact ring; and
    a blocking wedge, which can be shifted between a contact position in which it releases said clamping ends such that said spring can pull said clamping ends together,
    wherein the clamp may be mounted by spreading the clamping ends of said contact ring such that said battery clamp can be placed on said battery contact,
    wherein the clamp may be removed by spreading the clamping ends of said contact ring further apart than in said mounting position such that said battery clamp can be pulled off from said battery contact, wherein said blocking wedge is connected with a shiftily mounted covering cap, and wherein the covering cap encloses the contact ring.

11. The battery clamp according to claim 10, wherein each clamping end is provided with a bent-off lug which comprises a first slope, and wherein said blocking wedge is arranged between said lugs of said clamping ends.

12. The battery clamp according to claim 11, wherein each lug is provided with an arresting edge.

13. The battery clamp according to claim 10, wherein said spring is provided with a holding lug and wherein said blocking wedge is provided with a holding projection which is able to come into contact with said holding lug and limits a shift length of said blocking wedge.

14. The battery clamp according to claim 10, wherein an inner side of said contact ring is provided with a knurling.

15. The battery clamp according to claim 10, wherein said inner side of said contact ring is provided with grooves which run along a longitudinal direction of said battery contact onto which said battery clamp can be placed.

16. The battery clamp according to claim 10, wherein a lever is supported on said covering cap, said lever resting against said contact ring and by means of which said blocking wedge can be brought from said contact position via said mounting position into said pull-off position.

17. The battery clamp according to claim 16, wherein said lever is provided with a first support surface which can rest against said contact ring, and with a second support surface which, as seen from an axis of rotation of said lever, lies outside said first support surface, a contact area being formed between said first and second support surfaces.

18. The battery clamp according to claim 17, wherein said contact ring is provided with at least one recess and wherein a key lug is provided on said covering cap, said key lug being adapted to rest against an edge of said recess and preventing a movement of said blocking wedge into said contact position if there is not arranged a battery contact in an interior of said contact ring.

19. The battery clamp according to claim 18, wherein said key lug extends along a direction of movement of said blocking wedge and is provided with two slope surfaces which cooperate with a slope on said edge of said recess.

* * * * *